United States Patent
Yokomizo et al.

(10) Patent No.: US 8,064,618 B2
(45) Date of Patent: Nov. 22, 2011

(54) DIRECTION DETECTION APPARATUS, DIRECTION DETECTION METHOD AND DIRECTION DETECTION PROGRAM, AND DIRECTION CONTROL APPARATUS, DIRECTION CONTROL METHOD, AND DIRECTION CONTROL PROGRAM

(75) Inventors: Katsuaki Yokomizo, Kanagawa (JP); Takuya Daishin, Kanagawa (JP); Yoshitaka Miyake, Kanagawa (JP)

(73) Assignee: Sony Corporation (JP)

( * ) Notice: Subject to any disclaimer, the term of this patent is extended or adjusted under 35 U.S.C. 154(b) by 775 days.

(21) Appl. No.: 12/220,738

(22) Filed: Jul. 28, 2008

(65) Prior Publication Data
US 2009/0034753 A1 Feb. 5, 2009

(30) Foreign Application Priority Data
Jul. 31, 2007 (JP) ................................ P2007-199113

(51) Int. Cl.
*H04R 3/00* (2006.01)
(52) U.S. Cl. ........................................................ 381/92
(58) Field of Classification Search ...................... 381/92
See application file for complete search history.

(56) References Cited

U.S. PATENT DOCUMENTS
5,686,957 A * 11/1997 Baker .............................. 348/36

FOREIGN PATENT DOCUMENTS
| JP | 04-097666 A | 3/1992 |
| JP | 05-056426 A | 3/1993 |
| JP | 2002-218583 A | 8/2002 |
| JP | 2003-008974 A | 1/2003 |
| JP | 2004-015516 A | 1/2004 |

* cited by examiner

Primary Examiner — Marcos D. Pizarro
(74) Attorney, Agent, or Firm — Lerner, David, Littenberg, Krumholz & Mentlik, LLP

(57) ABSTRACT

A direction detection apparatus is disclosed. The direction detection apparatus includes a distribution obtainment section, an emphasis section, and a direction selection section. The distribution obtainment section obtains a distribution of intensities of sounds in a predetermined directional range. The emphasis section emphasizes sounds in the distribution of the intensities of the sounds obtained by the distribution obtainment section, wherein the emphasis section emphasizes the sounds in a second directional range which is a narrower directional range than the predetermined directional range and a center of the second directional range corresponds to a direction represented by selection information. The direction selection section decides a direction to be selected next based on the distribution of the intensities of the sounds which are output from the emphasis section and outputs the direction decided to be selected next as the selection information.

19 Claims, 17 Drawing Sheets

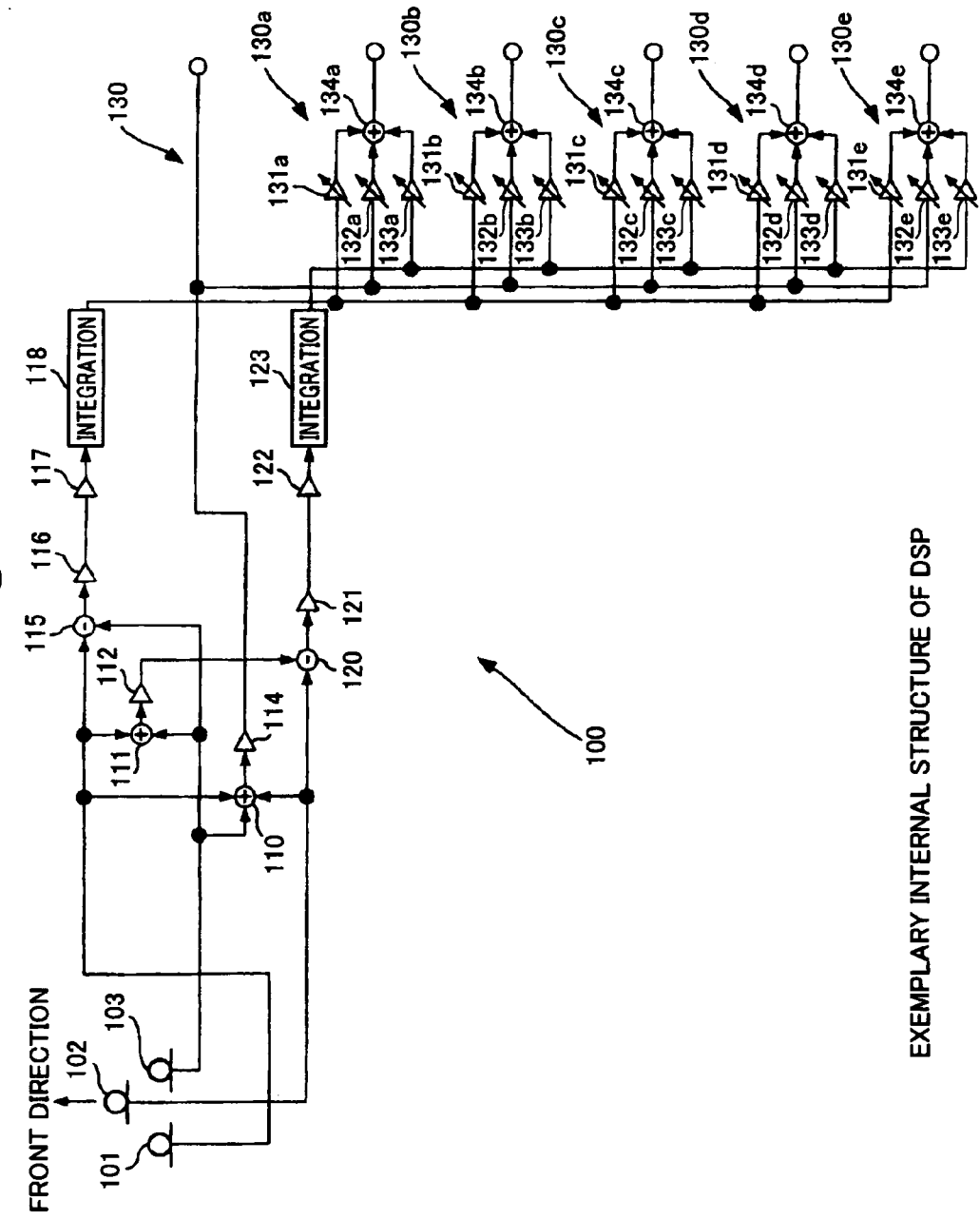

EXEMPLARY FREQUENCY CHARACTERISTIC
AND DIRECTIVITY OF OUTPUT OF INTEGRATION SECTION

EXEMPLARY FREQUENCY CHARACTERISTIC
AND DIRECTIVITY OF OUTPUT OF INTEGRATION SECTION

EXEMPLARY FREQUENCY CHARACTERISTIC
AND DIRECTIVITY OF OUTPUT OF INTEGRATION SECTION

EXEMPLARY DIRECTIONAL SYNTHESIS

EXEMPLARY FREQUENCY CHARACTERISTIC AND DIRECTIVITY

EXEMPLARY FREQUENCY CHARACTERISTIC AND DIRECTIVITY

EXEMPLARY FREQUENCY CHARACTERISTIC AND DIRECTIVITY

EXEMPLARY FREQUENCY CHARACTERISTIC AND DIRECTIVITY

EXEMPLARY FREQUENCY CHARACTERISTIC AND DIRECTIVITY

Fig. 15

|        | ANGLE [deg] | ADDITION VALUE [dBSPL] |                     |
|--------|-------------|------------------------|---------------------|
| k[n-4] | -28.8       | 35.9                   |                     |
| k[n-3] | -21.6       | 36.6                   |                     |
| k[n-2] | -14.4       | 37.2                   |                     |
| k[n-1] | -7.2        | 37.8                   |                     |
| k[n]   | 0           | 38.4                   | (CURRENT DIRECTION) |
| k[n+1] | 7.2         | 37.8                   |                     |
| k[n+2] | 14.4        | 37.2                   |                     |
| k[n+3] | 21.6        | 36.6                   |                     |
| k[n+4] | 28.8        | 35.9                   |                     |

DIRECTION DETECTION APPARATUS, DIRECTION DETECTION METHOD AND DIRECTION DETECTION PROGRAM, AND DIRECTION CONTROL APPARATUS, DIRECTION CONTROL METHOD, AND DIRECTION CONTROL PROGRAM

CROSS-REFERENCE TO RELATED APPLICATIONS

The present application claims priority from Japanese Patent Application No. JP 2007-199113, filed in the Japanese Patent Office on Jul. 31, 2007, the entire content of which is incorporated herein by reference.

BACKGROUND OF THE INVENTION

1. Field of the Invention

The present invention relates to a direction detection apparatus, a direction detection method, and a direction detection program, and also relates to a direction control apparatus, a direction control method, and a direction control program particularly suitable for use with an imaging apparatus to automatically track an object.

2. Description of the Related Art

When a video camera shoots speakers of a conference, attendees of a party, playing children, or the like without the intervention of a dedicated camera man or camera woman, since it is necessary to fix the video camera with a tripod or the like, the video camera shoots images only in one direction. Since images shot in this manner are unidirectional, they are often become monotonous because they are shot regardless of speakers and cheers in the situations.

To solve such a problem, techniques that automatically select an object and an angle of field, pan and tilt a camera corresponding to the selected object and angle of field, and cause the camera to track a noticeable direction without necessity of its operation have been proposed. Japanese Patent Application Laid-Open No. HEI 5-56426 describes a technique of preventing shooting directions from being unnecessarily changed and capable of recording natural and comfortable images.

In Japanese Patent Application Laid-Open No. HEI 5-56426, a speaker is detected with audio signals received from a plurality of microphones and a camera is controlled to shoot the detected speaker in close-up. In this method, after the speaker is detected, the detection operation is stopped for a predetermined period of time to prevent the camera from changing the shooting directions with input sounds such as noise and talking of other attendees (eg, a nod to a speech).

In this method, however, if the detection operation is set for a short stop time, the shooting directions of the camera are frequently changed. It is likely that recorded images would feel the audience uncomfortable. In particular, display apparatus that display recorded images are becoming large in recent years. Thus, if the shooting directions are frequently changed, images are rapidly moved. As a result, it is likely that the audience would feel very uncomfortable.

In contrast, if the detection operation is set for a long stop time to prevent such a problem, the camera is prevented unnecessarily from changing its shooting directions. Thus, in this method, it was difficult to set the detection operation for a proper stop time.

SUMMARY OF THE INVENTION

In view of the foregoing, it would be desirable to provide a direction detection apparatus, a direction detection method, a direction detection program and to provide a direction control apparatus, a direction control method, and a direction control program that prevent shooting directions from being unnecessarily changed, properly track an object, and shoot natural and comfortable images in particular for use with an imaging apparatus to automatically track an object.

According to an embodiment of the present invention, there is provided a direction detection apparatus including a distribution obtainment section, an emphasis section, and a direction selection section. The distribution obtainment section obtains a distribution of intensities of sounds in a predetermined directional range. The emphasis section emphasizes sounds in the distribution of the intensities of the sounds obtained by the distribution obtainment section, wherein the emphasis section emphasizes the sounds in a second directional range which is a narrower directional range than the predetermined directional range and a center of the second directional range corresponds to a direction represented by selection information. The direction selection section decides a direction to be selected next based on the distribution of the intensities of the sounds which are output from the emphasis section and outputs the direction decided to be selected next as the selection information.

According to an embodiment of the present invention, there is provided a direction detection method. A distribution of intensities of sounds is obtained in a predetermined directional range. Sounds are emphasized in the distribution of the intensities of the sounds obtained at the distribution obtainment step, wherein at the emphasis step, the sounds in a second directional range which is a narrower directional range than the predetermined directional range are emphasized and a center of the second directional range corresponds to a direction represented by selection information. A direction to be selected next is decided based on the distribution of the intensities of the sounds which are output and the direction decided to be selected next is output as the selection information.

According to an embodiment of the present invention, there is provided a program which causes a computer to execute a direction detection method. A distribution of intensities of sounds is obtained in a predetermined directional range. Sounds are emphasized in the distribution of the intensities of the sounds obtained at the distribution obtainment step, wherein at the emphasis step, the sounds in a second directional range which is a narrower directional range than the predetermined directional range are emphasized and a center of the second directional range corresponds to a direction represented by selection information. A direction to be selected next is decided based on the distribution of the intensities of the sounds which are output and the direction decided to be selected next is output as the selection information.

According to an embodiment of the present invention, there is provided a direction control apparatus including a drive control section, a distribution obtainment section, an emphasis section, and a direction designation section. The drive control section drives a drive section in a designated direction. The distribution obtainment section obtains a distribution of intensities of sounds in a predetermined directional range. The emphasis section emphasizes sounds in the distribution of the intensities of the sounds obtained by the distribution obtainment section, wherein the emphasis section emphasizes the sounds in a second directional range which is a narrower directional range than the predetermined directional range and a center of the second directional range corresponds to a direction in which the drive control section is currently driving the drive section. The direction designation section designates a direction in which the drive control section causes the drive section to drive based on the distribution of the intensities of the sounds which are output from the emphasis section.

According to an embodiment of the present invention, there is provided a direction control method. A drive section is driven in a designated direction. A distribution of intensities of sounds is obtained in a predetermined directional range. Sounds are emphasized in the distribution of the intensities of the sounds obtained at the distribution obtainment step, wherein at the emphasis step, the sounds in a second directional range which is a narrower directional range than the predetermined directional range are emphasized and a center of the second directional range corresponds to a direction in which the drive section is being currently driven. A direction in which the drive section is caused to drive is designated based on the distribution of the intensities of the sounds which are output.

According to an embodiment of the present invention, there is provided a program which causes a computer to execute a direction control method. A drive section is driven in a designated direction. A distribution of intensities of sounds is obtained in a predetermined directional range. Sounds are emphasized in the distribution of the intensities of the sounds obtained at the distribution obtainment step, wherein at the emphasis step, the sounds in a second directional range which is a narrower directional range than the predetermined directional range are emphasized and a center of the second directional range corresponds to a direction in which the drive section is being currently driven. A direction in which the drive section is caused to drive is designated based on the distribution of the intensities of the sounds which are output.

According to embodiments of the present invention, a distribution of intensities of sounds is obtained in a predetermined directional range. Sounds are emphasized in the distribution of the intensities of the obtained sounds, wherein at the emphasis step, the sounds in a second directional range which is a narrower directional range than the predetermined directional range are emphasized and a center of the second directional range corresponds to a direction represented by selection information. A direction to be selected next is decided based on the distribution of the intensities of the sounds which are output and the direction decided to be selected next is output as the selection information. Thus, if a sound occurs in a direction other than the second directional range, the selection of the direction is suppressed.

According to embodiments of the present invention, a drive section is driven in a designated direction. A distribution of intensities of sounds is obtained in a predetermined directional range. Sounds are emphasized in the distribution of the intensities of the obtained sounds, wherein at the emphasis step, the sounds in a second directional range which is a narrower directional range than the predetermined directional range are emphasized and a center of the second directional range corresponds to a direction in which the drive section is being currently driven. A direction in which the drive section is caused to drive is designated based on the distribution of the intensities of the sounds which are output. Thus, if a sound occurs in a direction other than the second directional range, the driving of the drive section is suppressed.

According to embodiments of the present invention, a distribution of intensities of sounds is obtained in a predetermined directional range. Sounds are emphasized in the distribution of the intensities of the obtained sounds, wherein at the emphasis step, the sounds in a second directional range which is a narrower directional range than the predetermined directional range are emphasized and a center of the second directional range corresponds to a direction represented by selection information. A direction to be selected next is decided based on the distribution of the intensities of the sounds which are output and the direction decided to be selected next is output as the selection information. Thus, if a sound occurs in a direction other than the second directional range, an effect of which the selection of the direction is suppressed is obtained.

According to embodiments of the present invention, a drive section is driven in a designated direction. A distribution of intensities of sounds is obtained in a predetermined directional range. Sounds are emphasized in the distribution of the intensities of the obtained sounds, wherein at the emphasis step, the sounds in a second directional range which is a narrower directional range than the predetermined directional range are emphasized and a center of the second directional range corresponds to a direction in which the drive section is being currently driven. A direction in which the drive section is caused to drive is designated based on the distribution of the intensities of the sounds which are output. Thus, if a sound occurs in a direction other than the second directional range, an effect of which the driving of the drive section is suppressed is obtained.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 3 is a block diagram showing an exemplary structure that synthesizes directivities with three omnidirectional microphones and obtains five-channel unidirectivities;

FIG. 15 is a schematic diagram showing exemplary addition constants to be added to evaluation values;

DETAILED DESCRIPTION OF THE PREFERRED EMBODIMENTS

Next, an embodiment of the present invention will be described. In the present invention, the distribution of intensities of sounds in a predetermined directional range, for example, the entire circumference 360°, is obtained as evaluation values. Evaluation values in a second directional range that is narrower than the predetermined directional range around the currently selected direction are weighted and the currently selected direction is emphasized. A direction is selected on the basis of the evaluation values of which sounds in the second directional range around the currently selected direction have been emphasized and a direction control is performed for the selected direction. Thus, the current direction and its periphery are preferentially selected. For example, if an object (eg, a sound source) is moved, the direction is tracked. If a sound is generated in a direction other than in the second directional range, the direction control is suppressed for the direction. As a result, the direction control can be naturally performed.

Figure 1A:
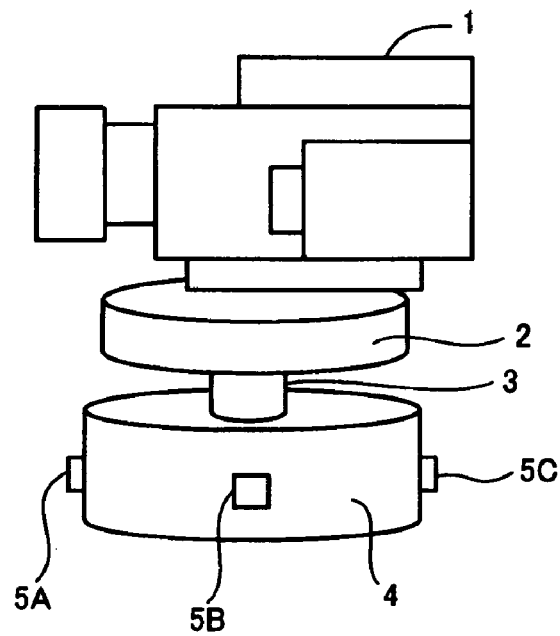
FIG. 1A and FIG. 1B are schematic diagrams showing an embodiment of the present invention.
Figure 1B:
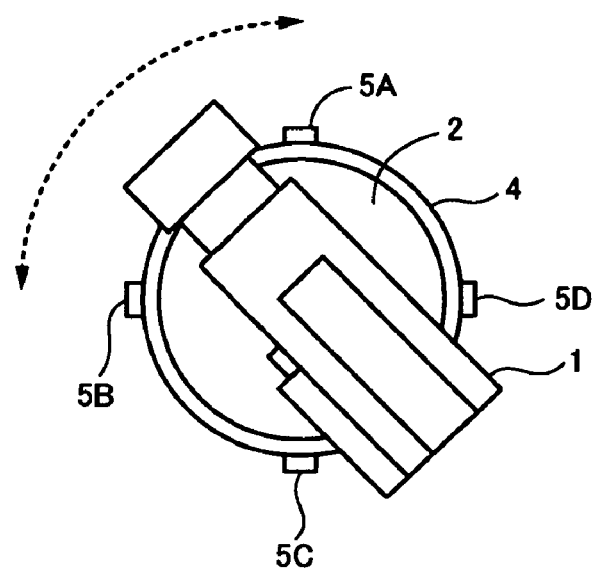

FIG. 1A and FIG. 1B schematically show an embodiment of the present invention. FIG. 1A is an overall view, whereas FIG. 1B is a top view. A camera platform 2 is designed to mount, for example, a video camera 1. The camera platform 2 can be rotated to left and right through a rotation shaft 3 by a rotation drive section (not shown) disposed in a drive table 4. The drive table 4 is mounted, for example, to a tripod. Mounted on the drive table 4 are omnidirectional microphones 5A, 5B, 5C, and 5D at intervals of 90° on a two-dimensional plane around the rotation shaft 3. In the following, for convenience, it is assumed that the microphone 5A faces the front.

For easy understanding, FIG. 1A and FIG. 1B show that the microphones 5A, 5B, 5C, and 5D are disposed around the drive table 4. Specifically, these four microphones are more densely disposed than those shown in FIG. 1A and FIG. 1B. As will be described later, it is preferred that the mutual distances of the microphones 5A, 5B, 5C, and 5D be equal to or smaller than the wavelengths of sounds to be collected. For example, the microphones 5A, 5B, 5C, and 5D are disposed such that their mutual distances are several centimeters or less.

In the structure shown in FIG. 1A and FIG. 1B, surrounding sounds are collected by the microphones 5A, 5B, 5C, and 5D and evaluation values for the direction that the camera platform 2, namely the video camera 1, is caused to face are obtained on the basis of the collected sounds. The rotation drive section is driven on the basis of the evaluation values, the camera platform 2 is rotated, and the video camera 1 is caused to face the direction of the object. At this point, the evaluation values are weighted on the basis of the direction that the video camera is caused to face when sounds are recorded. As a result, even if sounds occur in directions other than the current direction of the object, the directions of the video camera 1 can be prevented from being unnecessarily changed.

Figure 2:
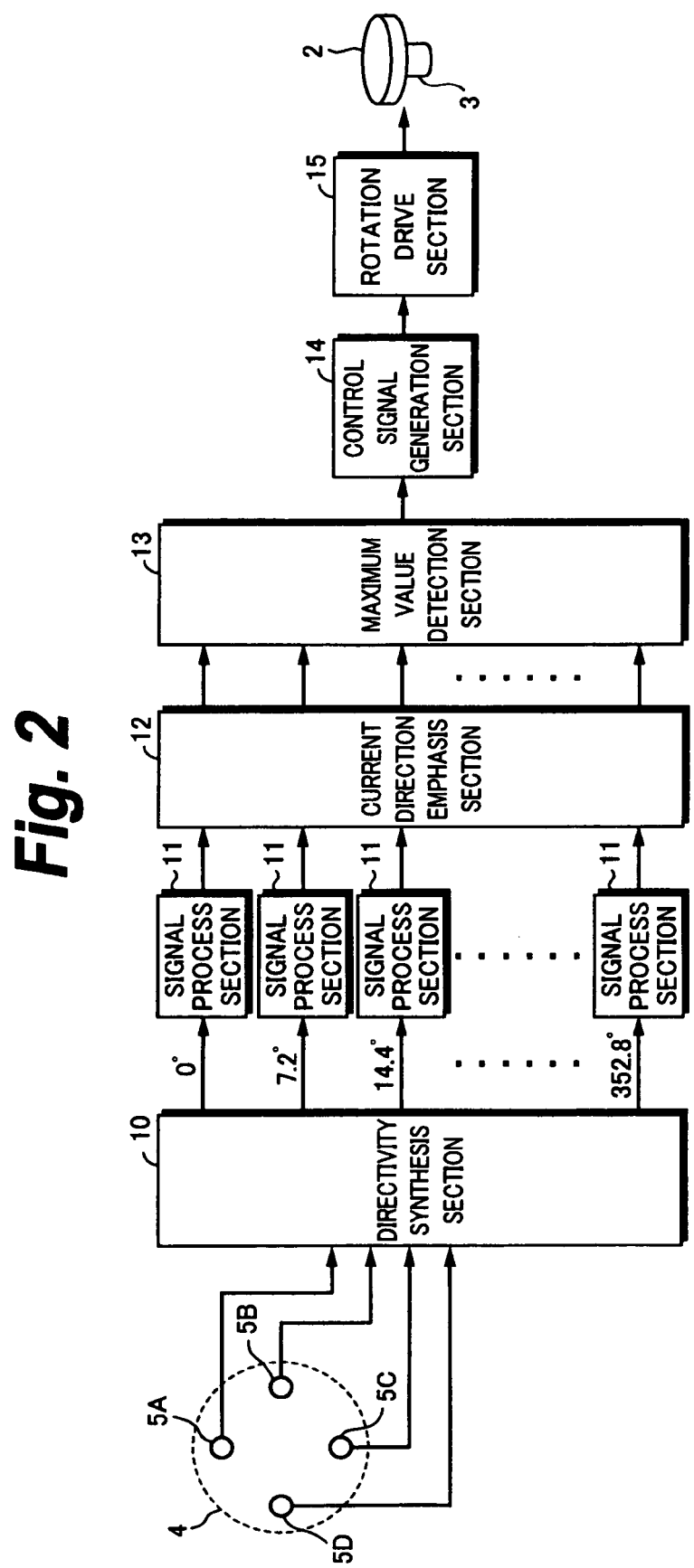
FIG. 2 is a block diagram showing an exemplary structure of a direction control apparatus according to en embodiment of the present invention.

FIG. 2 shows an exemplary structure of a direction control apparatus according to an embodiment of the present invention. Analog audio signals that are output from the microphones 5A, 5B, 5C, and 5D are converted into digital audio signals by A/D converters (not shown) and then supplied to a directivity synthesis section 10. The directivity synthesis section 10 is composed, for example, of one digital signal processor (DSP). The directivity synthesis section 10 synthesizes a directivity with sounds of a plurality of directions at a predetermined synthesis ratio and can obtain the same characteristic as the case that a unidirectional microphone is caused to face any direction. The directivity synthesis section 10 synthesizes directivities on the basis of audio signals supplied from the microphones 5A, 5B, 5C, and 5D such that directivities can be obtained with a resolution of steps at which the entire circumference 360° on the two-dimensional plane is divided.

In the following, it is assumed that the directivity synthesis section 10 divides the entire circumference 360° in 50 directions and obtains directivities with a resolution of 7.2° step. Since the angle of field of a regular video camera is around 45°, it can be thought that the resolution of a step of 7.2° is sufficient against the field of angle.

The directivity synthesis section 10 outputs audio signals that have been directionally synthesized at steps of directivities. In other words, the directivity synthesis section 10 outputs audio signals that have been directionally synthesized in the directions of 0°, 7.2°, 14.4°, 21.6°, and so forth in the front direction.

The audio signals that are output from the directivity synthesis section 10 are supplied to signal process sections 11, 11, . . . and so forth. The signal process sections 11, 11, . . . and so forth detect peaks of the supplied audio signals, detect envelops, remove fluctuations of sensitivities of the microphones 5A, 5B, 5C, and 5D and influence of the casing (drive table 4 in the example shown in FIG. 1) to which the microphones 5A, 5B, 5C, and 5D are mounted from the envelops, remove noise components from the envelops, and output the resultant signals.

Signals that are output from the signal process sections 11, 11, . . . and so forth represent the intensities of sounds in the directions of which the entire circumference 360° is divided into 50 channels at steps of 7.2° by the directivity synthesis section 10. In other words, the signals that are output from the signal process sections 11, 11, . . . and so forth represent the distribution of the intensities of sounds of the entire circumference 360° at steps of 7.2°. As will be described later, the direction that the camera platform 2 is caused to face is decided by evaluating the intensities of sounds in the individual directions. Thus, in the following, signals that are output from the signal process sections 11, 11, . . . and so forth are referred to as evaluation values.

The evaluation values of the individual directions that are output from the signal process sections 11, 11, . . . and so forth are supplied to a maximum value detection section 13 through a current direction emphasis section 12. The maximum value detection section 13 detects a direction having the maximum evaluation value from those supplied from the current direction emphasis section 12. Direction information that represents the detected direction is supplied to a control signal generation section 14. The control signal generation section 14 controls a rotation drive section 15 composed, for example, of a stepping motor such that the video camera 1 faces the direction represented by the direction information based on the direction information supplied from the maximum value detection section 13.

The current direction emphasis section 12 according to an embodiment of the present invention emphasizes evaluation values in the predetermined range around the direction that the video camera 1, namely the camera platform 2, currently faces of the evaluation values of the supplied directions. The emphasis process is performed by adding or multiplying the evaluation values corresponding to these directions to or by a predetermined value. The maximum value detection section 13 detects the maximum value from those for which the emphasis process has been performed and obtains the corresponding direction.

Next, each section that composes the foregoing direction control apparatus will be described in more detail. First, with reference to FIG. 3 to FIG. 10, the theory of the directivity synthesis section 10 will be described. The process of synthesizing directivities of any direction can be performed with three omnidirective microphones. FIG. 3 shows an exemplary structure that synthesizes five-channel unidirectivities with three omnidirective microphones 101, 102, and 103.

The microphones 101, 102, and 103 may be disposed such that they form vertexes of an equilateral triangle. For example, the microphones 101 and 103 are disposed on a straight line perpendicular to the front direction and the microphone 102 may be disposed in the front direction. Instead, the microphones 101 and 103 may be disposed on a straight line perpendicular to the front direction and the microphone 102 may be disposed in the rear direction such that the microphones 101, 102, and 103 form vertexes of an inverted equilateral triangle. If the microphones 101, 102, and 103 are disposed on an identical straight line, unidirectional audio signals are generated only in the front and rear directions or in the left and right directions. Thus, it is necessary not to dispose all the microphones 101, 102, and 103 only on an identical straight line. In addition, it is necessary to dispose the microphones with distances sufficiently smaller than the wavelengths of sound waves having the minimum frequency of a necessary frequency band, for example several centimeters or less.

In FIG. 3, audio signals that are output from the microphones 101, 102, and 103 are supplied to a DSP 100 that performs the directional synthesis process. The DSP 100 has a first addition section 110, a second addition section 111, a first subtraction section 115, a second subtraction section 120, multiplication sections 112, 114, 116, 117, 121, and 122, a first integration section 118, and a second integration section 123. The first and second addition sections 110 and 111 add audio signals. The first and second subtraction sections 115 and 120 subtract audio signals. The multiplication sections 112, 114, 116, 117, 121, and 122 multiply audio signals by predetermined coefficients. The first and second integration sections 118 and 123 correct frequency characteristics. In addition, the DSP 100 has five-channel output sections 130a to 130e that synthesize five unidirectivities. The output sections 130a to 130e have variable amplifiers 131a to 131e, 132a to 132e, and 133a to 133e and addition sections 134a to 134e. The variable amplifiers 131a to 131e, 132a to 132e, and 133a to 133e variably amplify audio signals. The addition sections 134a to 134e add variably amplified audio signals. In FIG. 3, the DSP 100 also has an output section 130 that outputs an audio signal of an ultra low frequency audio range.

The omnidirectional microphones 101, 102, and 103 disposed in a triangle shape in the front direction collect sounds and output audio signals. The audio signals that are output from the microphones 101, 102, and 103 are added by the first addition section 110. The added result is multiplied by a predetermined coefficient (eg, ⅓) by the multiplication section 114 to synthesize an omnidirectivity.

On the other hand, the audio signal that is output from the omnidirectional microphone 101 disposed, for example, on the left in the front direction and the audio signal that is output from the omnidirectional microphone 103 disposed, for example, on the right in the front direction are added by the second addition section 111 and the addition result is multiplied by a predetermined coefficient (eg, ½) by the multiplication section 102. As a result, a virtual omnidirectivity at the midpoint of the microphone 101 and the microphone 103 is synthesized.

On the other hand, the difference between the audio signal that is output from the multiplication section 112 and the audio signal that is output from the front omnidirectional microphone 102 is obtained by the second subtraction section 120 and the obtained difference is multiplied by a predetermined coefficient by the multiplication section 121. As a result, the front and rear directivity is synthesized.

In this context, the sensitivity of the omnidirectivity that is output from the multiplication section 114 is referred to as "the maximum directional sensitivity". Adjusting of the directivity sensitivities of the audio signals that are output from the other multiplication sections 116 and 121 based on "the maximum directional sensitivity" is referred to as "normalizing". Since the normalizing allows for matching of the maximum directional sensitivities of audio signals that are output from the multiplication sections 114, 116, and 121, the directivities can be easily synthesized.

The difference between the audio signal that is output from the omnidirectional microphone 101 disposed on the left in the front direction and the audio signal that is output from the omnidirectional microphone 103 disposed on the right in the front direction is obtained by the first subtraction section 115. The difference is multiplied by a predetermined coefficient by the multiplication section 116 and then the result is normalized by the maximum directional sensitivity to synthesize the left and right bidirectivity.

The left and right directional signal that is output from the multiplication section 116 is multiplied by a predetermined coefficient by the multiplication section 117 and the front and rear directional signal that is output from the multiplication section 121 is multiplied by a predetermined coefficient by the multiplication section 122. Thereafter, the left and right directional signal, the front and rear directional signal, and the omnidirectivity that is output from the multiplication section 114 are normalized by the maximum directional sensitivity.

Since the output signals of the multiplication section 117 and the multiplication section 122 are differences of sound waves that arrive at the front and rear microphones and left and the right microphones, respectively, the phase differences hardly occur in low frequency signals whose wave lengths are longer than the distances of the microphones. Thus, the frequency characteristics of audio signals that are output from the multiplication section 117 and the multiplication section 122 attenuate toward the flow frequency region. It is well known that the directional characteristics of microphones are not constant against frequencies. Thus, the gains of low frequency audio signals that are attenuated by and output from the multiplication sections 117 and 122 are raised and the frequency characteristics are corrected by the integration sections 118 and 123.

Figure 4A:
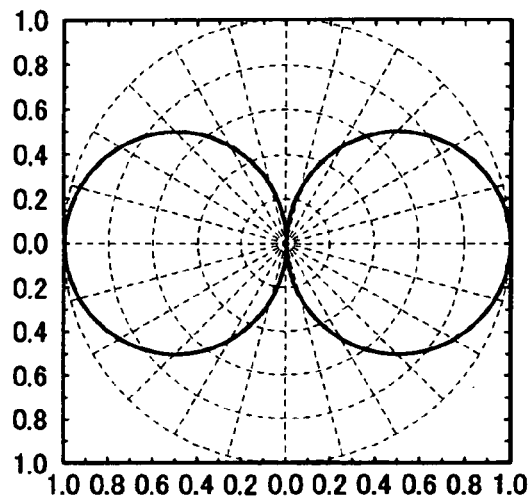
FIG. 4A, FIG. 4B, and FIG. 4C shows exemplary directional characteristics obtained by adding and subtracting audio signals that are output from three microphones and correcting their frequencies.
Figure 4B:
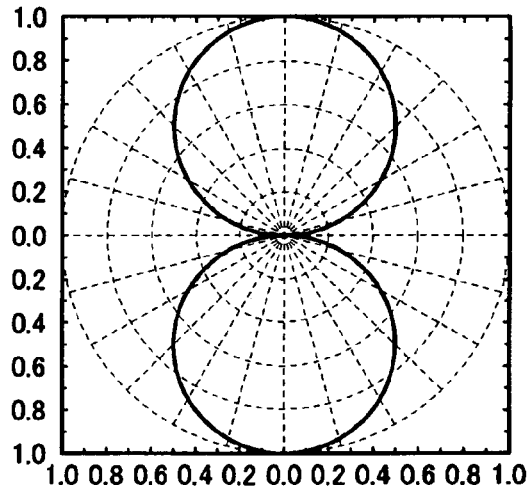

FIG. 4A, FIG. 4B, and FIG. 4 show exemplary directional characteristics of audio signals that are output from the integration section 118, the integration section 123, and the multiplication section 114. FIG. 4A shows an exemplary directional characteristic of the audio signal that is output from the integration section 118. The audio signal that is output from the integration section 118 represents a directional characteristic corresponding to the difference between the microphones 101 and 103 disposed on the left and right in the front direction. This directional characteristic represents the left and right directional characteristic as exemplified in FIG. 4A.

FIG. 4B shows an exemplary directional characteristic of the audio signal that is output from the integration section 123. The audio signal that is output from the integration section 123 represents a directional characteristic corresponding to the difference between the output of the microphone 102 disposed in the front direction and the synthesized output of the outputs of the microphones 101 and 103 disposed in the front direction or rear direction of the microphone 102 and on the left and right of the microphone 102. This directional characteristic represents the front and rear directional characteristic as exemplified in FIG. 4B.

Figure 4C:
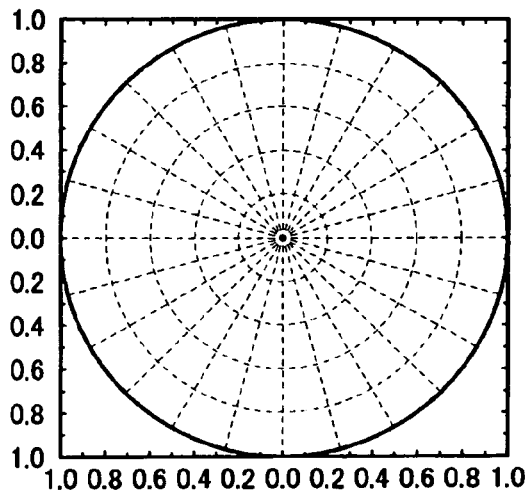
Figure 5A:
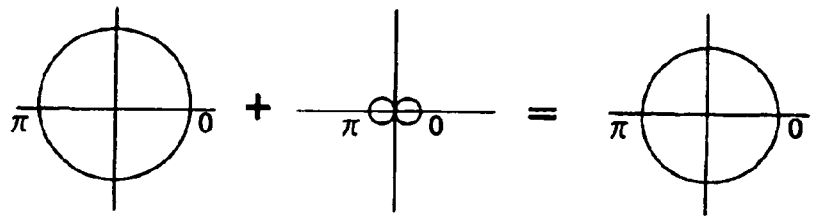
FIG. 5A, FIG. 5B, FIG. 5C, FIG. 5D, and FIG. 5E are schematic diagrams describing exemplary processes of synthesizing unidirectional audio signals.
Figure 5B:
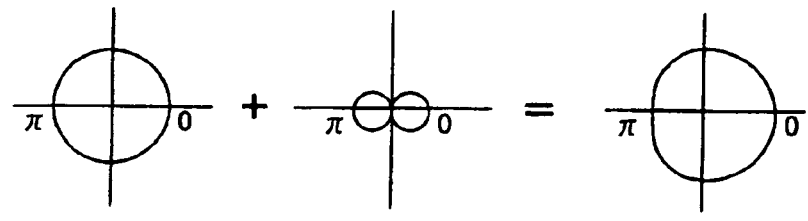
Figure 5C:
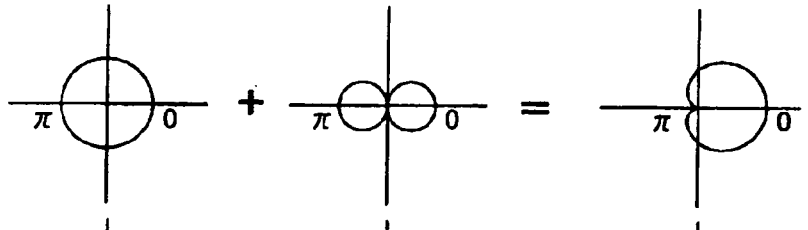
Figure 5D:
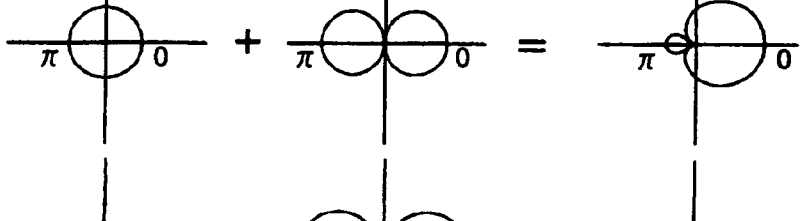
Figure 5E:
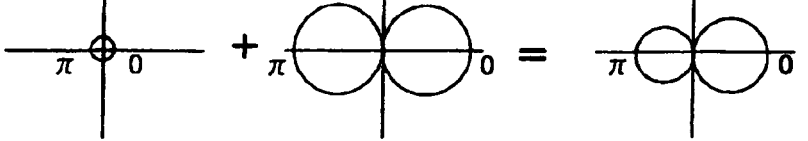

FIG. 4C shows an exemplary directional characteristic of the audio signal that is output from the multiplication section 114. The audio signal that is output from the multiplication section 114 represents a directional characteristic of the signal of which the outputs of the omnidirectional microphones 101, 102, and 103 are added. This directional characteristic represents an omnidirectional characteristic as exemplified in FIG. 4C. This omnidirectivity is referred to as the maximum directional sensitivity.

By adding and subtracting the audio signals that are output from the three microphones 101, 102, and 103, and if necessary by correcting the frequencies thereof, audio signals having left and right directivity, front and rear directivity, and omnidirectivity can be obtained. The audio signals that are output from the first integration section 118 and the second integration section 123 are a left and right directional characteristic and a front and rear directional characteristic that have been normalized by the maximum directional sensitivity, respectively. By changing a synthesis ratio of the omnidirectional characteristic, left and right directional characteristic, and front and rear directional characteristic that is output from the multiplication section 114, a unidirectional audio signal can be synthesized. Directional patterns that can be synthesized include, for example, cardioid, hyper cardioid, and super cardioid.

Next, with reference to FIG. 5A to FIG. 5E, an exemplary synthesis process of unidirectional audio signals will be described. FIG. 5A to FIG. 5E show exemplary directivities of output audio signals of which two input audio signals represented in polar coordinates are synthesized. The left side of the two input audio signals represents an omnidirectional component and the right side thereof represents a left and right directional component. The sensitivities of the audio signals are represented by the sizes of circles.

0° to 90° and 270° to 360° of audio signals are positive phase components. When positive phase components of two audio signals are added, the positive phase components are increased. On the other hand, 90° to 270° of audio signals are negative phase components. When negative phase components of two audio signals are added, the negative phase components are decreased. It is clear that when an omnidirectional component and a bidirectional component having variable sensitivities are added, an audio signal having any unidirectivity in the left and right directions can be generated. In FIG. 5A to FIG. 5E, exemplary syntheses of two input audio signals were described. Likewise, with audio signals having front and rear bidirectional components, an audio signal having a unidirectivity in any direction can be generated.

In the example shown in FIG. 3, the output sections 130a to 130e of individual channels synthesize audio signals having unidirectivities in any directions. In other words, in the output sections 130a to 130e of individual channels, the left and right bidirectional signal that is output from the integration section 118 is input to the variable amplifiers 131a to 131e, the omnidirectional signal that is output from the multiplication section 114 is input to the variable amplifiers 132a to 132e, and the front and rear bidirectional signal that is output from the integration section 123 is input to the variable amplifiers 133a to 133e. In the output sections 130a to 130e, the outputs of the three variable amplifiers are added by the addition sections 134a to 134e, respectively.

In this structure, by adjusting the variable amplifiers 131a to 131e, the variable amplifiers 132a to 132e, and the variable amplifiers 133a to 133e of the output sections 130a to 130e, unidirectional signals having unidirectivities in any directions can be synthesized and output. For example, in the output section 130a, by varying the synthesis ratio of the omnidirectivity and bidirectivity through coefficient multiplications of the variable amplifiers 131a, 132a, and 133a and addition of the addition section 134a, a unidirectivity can be synthesized. By varying coefficient ratios, any direction and any sub lobe can be set. In addition, by varying the synthetic ratio of the variable amplifiers 131a, 132a, and 132a, the shape of cardioid, namely the sensitivity of directional characteristic, can be changed.

Figure 6:
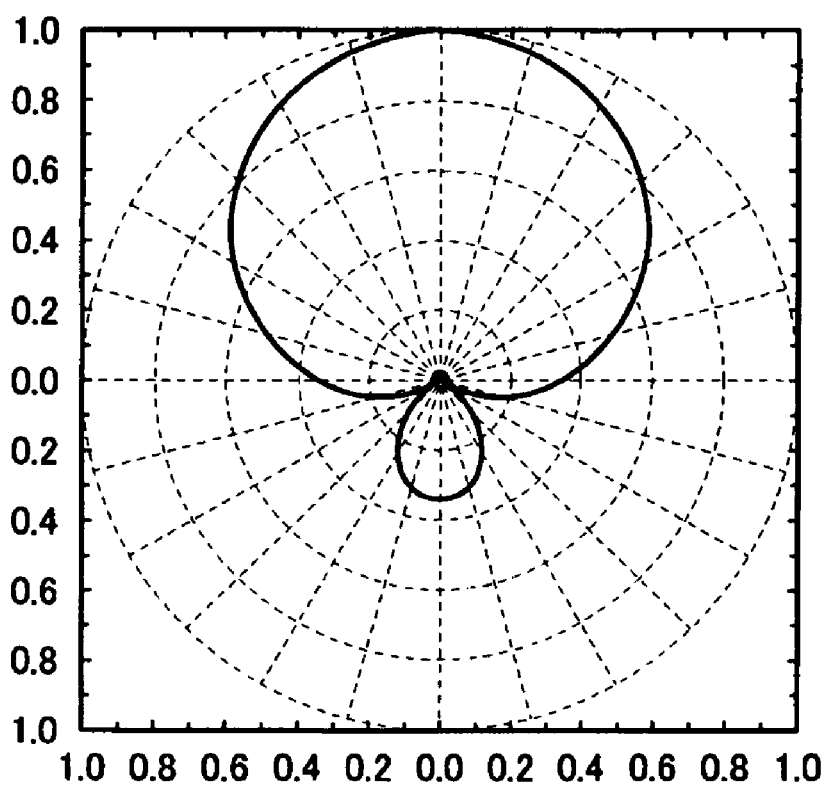
FIG. 6 is a schematic diagram showing exemplary directivities of audio signals of individual channels that are output from addition sections.
Figure 7:
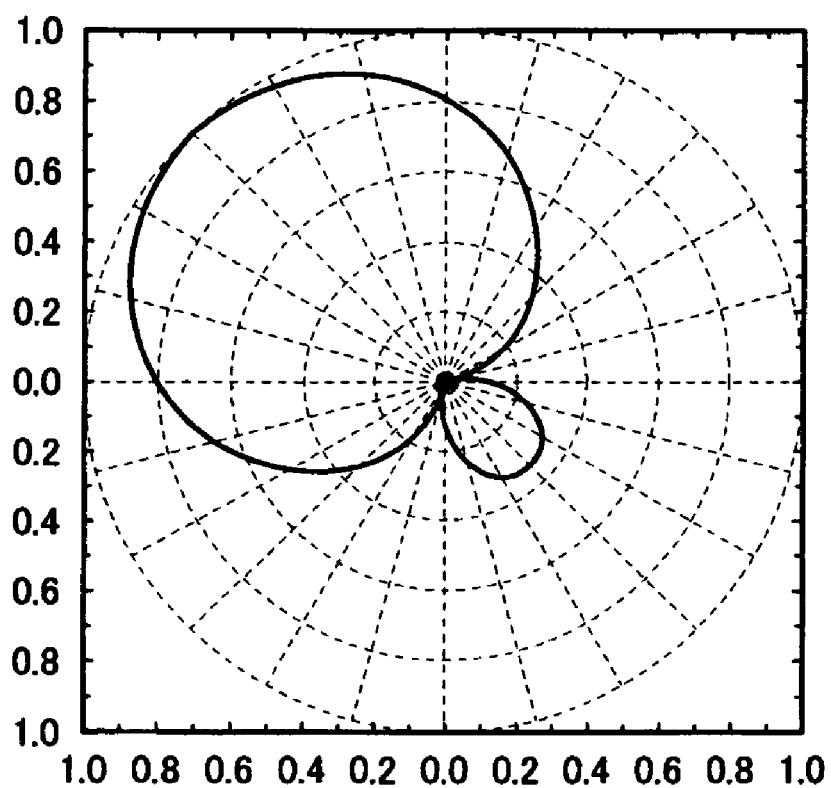
FIG. 7 is a schematic diagram showing exemplary directivities of audio signals of individual channels that are output from addition sections.
Figure 8:
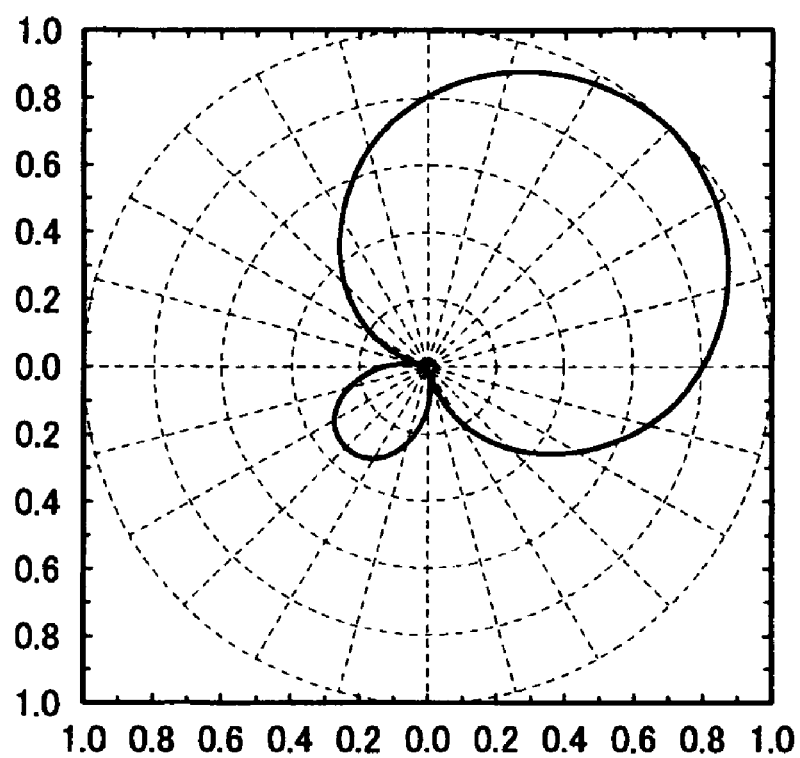
FIG. 8 is a schematic diagram showing exemplary directivities of audio signals of individual channels that are output from addition sections.
Figure 9:
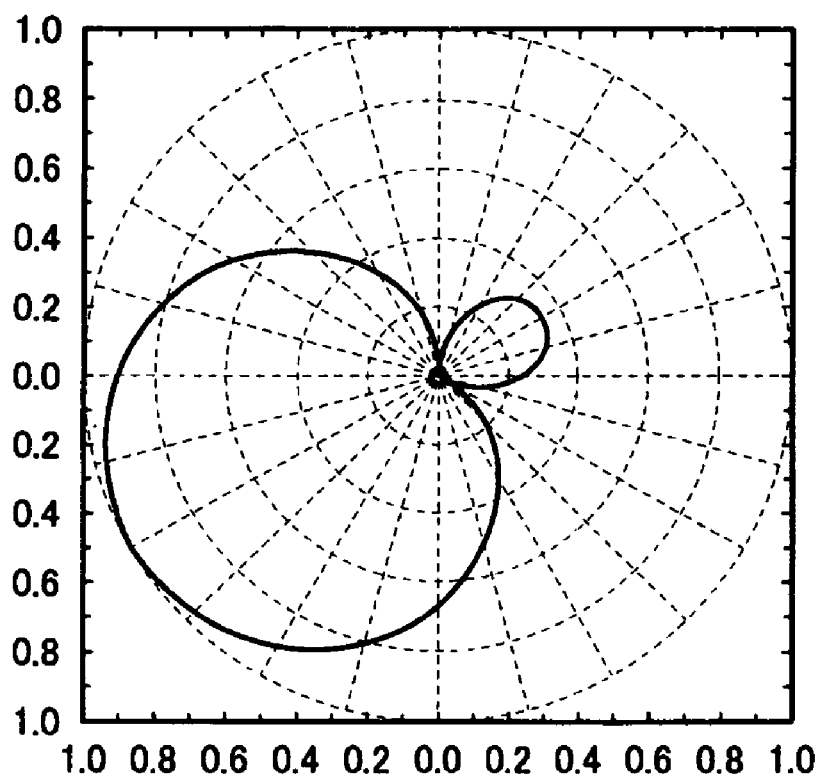
FIG. 9 is a schematic diagram showing exemplary directivities of audio signals of individual channels that are output from addition sections.
Figure 10:
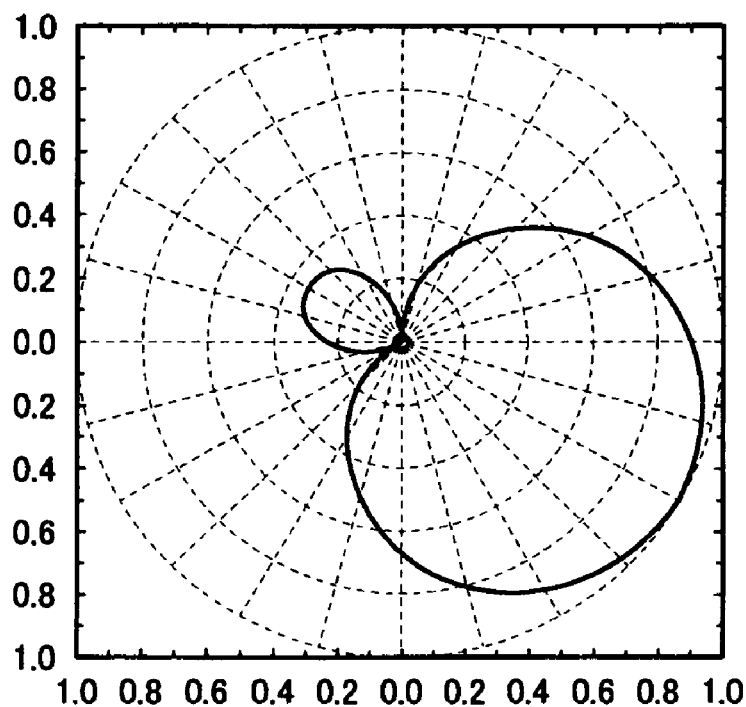
FIG. 10 is a schematic diagram showing exemplary directivities of audio signals of individual channels that are output from addition sections.

FIG. 6 to FIG. 10 show exemplary directivities of audio signals of individual channels that are output from the addition sections 134a to 134e. The audio signal that is output from the addition section 134a has a directivity as exemplified in FIG. 6. FIG. 6 shows that the directional pattern of the audio signal is hyper cardioid and has a unidirectivity in the center front direction. The audio signal that is output from the addition section 134b has a directivity as exemplified in FIG. 7. FIG. 7 shows that the directional pattern of the audio signal is hyper cardioid and has a unidirectivity in the left front direction. The audio signal that is output from the addition section 134c has a directivity as exemplified in FIG. 8. FIG. 8 shows that the directional pattern of the audio signal is hyper cardioid and has a unidirectivity in the right front direction. The audio signal that is output from the addition section 134d has a directivity as exemplified in FIG. 9. FIG. 9 shows that the directive pattern of the audio signal is hyper cardioid and has a unidirectivity in the rear left direction. The audio signal that is output from the addition section 134e has a directivity as exemplified in FIG. 10. FIG. 10 shows that the directional pattern of the audio signal is hyper cardioid and has a unidirectivity in the rear right direction.

In this embodiment of the present invention, as exemplified in FIG. 2, the directivity synthesis section 10 has outputs of 50 channels of which the entire circumference 360° is divided at steps of 7.2°. In the example shown in FIG. 3, the output section 130 has 50 blocks corresponding to the 50 channels. Each block has a structure composed of three variable amplifiers that multiply audio signals that are output from the integration section 118, the integration section 123 and the multiplication section 114 by coefficients and an addition section that adds the outputs of the three variable amplifiers.

In the example shown in FIG. 1 and FIG. 2, four microphones are disposed at intervals of 90°. The combinations of the microphones are changed corresponding to, for example, direction control. If direction control is performed such that the video camera 1 faces the front direction, the microphones 5A, 5B, and 5D are used. If direction control is performed such that the video camera 1 faces the rear direction, the microphones 5C, 5B, and 5D are used.

Figure 11:
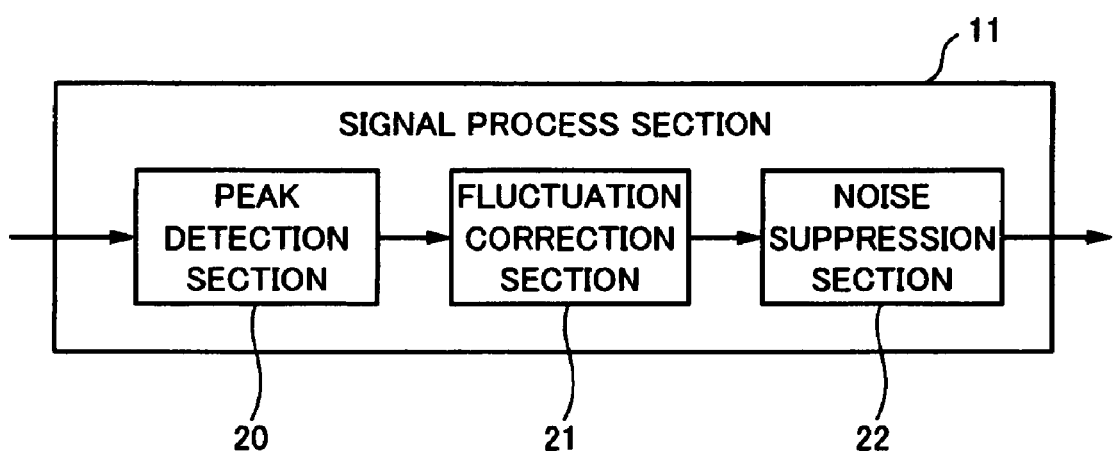
FIG. 11 is a block diagram showing an exemplary structure of a signal process section.

Next, the signal process section 11 will be described. FIG. 11 shows an exemplary structure of the signal process section 11. In the example shown in FIG. 11, the signal process section 11 is composed of a peak detection section 20, a fluctuation correction section 21, and a noise suppression section 22. When an audio signal having a directivity in a particular direction that is output from the directivity synthesis section 10 is supplied to the signal process section 11, the audio signal is supplied to the peak detection section 20. The peak detection section 20 performs a peak detection process for the audio signal and extracts an envelop therefrom. For example, the peak detection section 20 separates the input audio signal at intervals of a predetermined number of samples (eg, 16 samples of a sampling frequency 48 kHz). The peak detection section 20 obtains the absolute values of samples at intervals of the predetermined number of samples, extracts the maximum value therefrom, and obtains the extracted maximum value as a detected signal.

Figure 12:
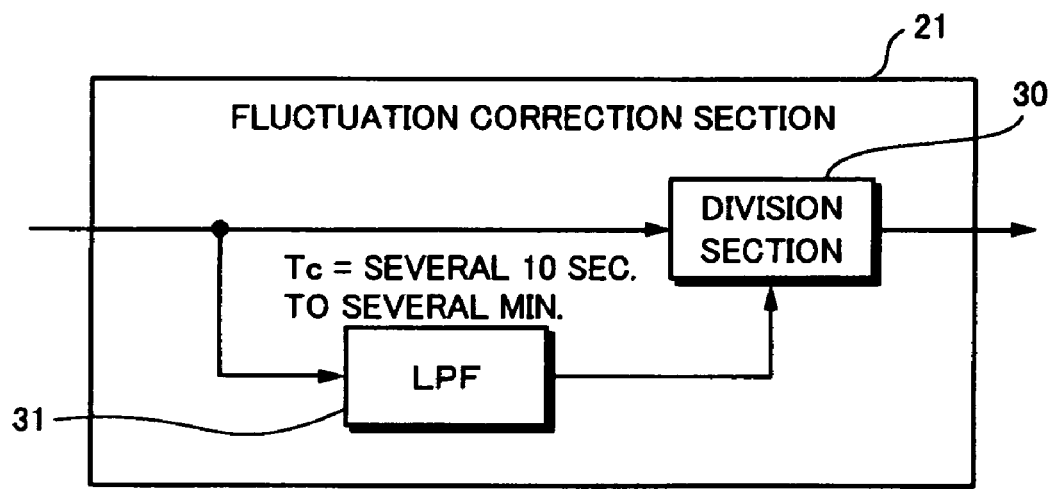
FIG. 12 is a block diagram showing an exemplary structure of a fluctuation correction section.

The output of the peak detection section 20 is supplied to the fluctuation correction section 21. The fluctuation correction section 21 corrects systematic fluctuations of sensitivities of the microphones 5A, 5B, 5C, and 5D resulting from their characteristic differences and an influence of the casing to which they are mounted. FIG. 12 shows an exemplary structure of the fluctuation correction section 21. The fluctuation correction section 21 has a division section 30 and a low pass filter 31. An audio signal is supplied to one input terminal of the division section 30 and the other input terminal of the division section 30 through the low pass filter 31. The division section 30 divides the signal that has been supplied to one input terminal by the signal that has been supplied to the other input terminal.

Time constant Tc of the low pass filter 31 is set for a relatively long period ranging from several 10 seconds to several minutes. Thus, signals that are input to the signal process sections 11, 11, . . . and so forth can be normalized.

Figure 13:
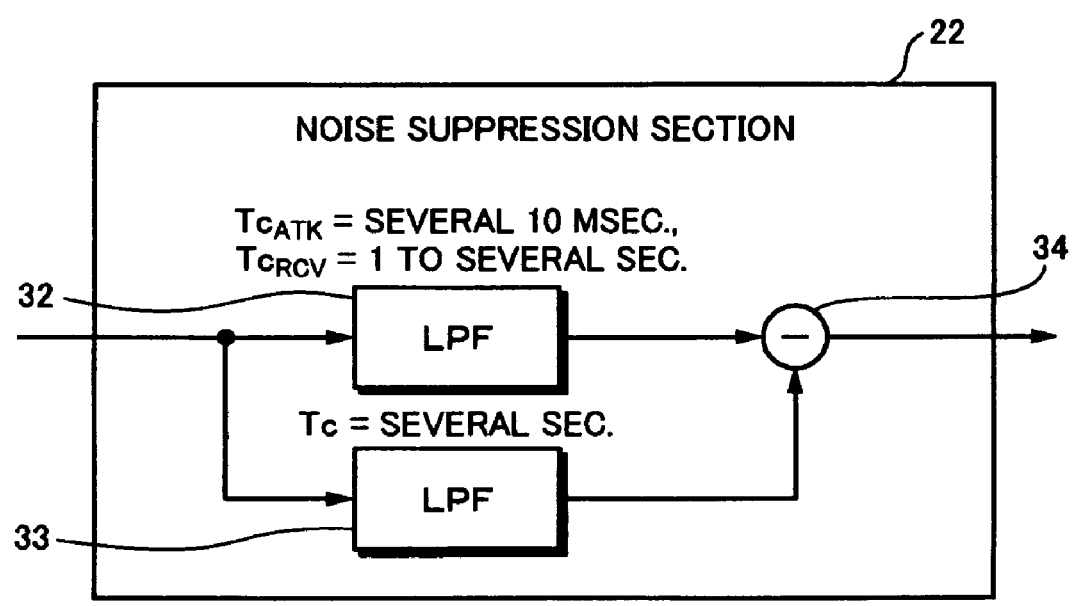
FIG. 13 is a block diagram showing an exemplary structure of a noise reduction section.

The output of the fluctuation correction section 21 is supplied to the noise suppression section 22. FIG. 13 shows an exemplary structure of the noise suppression section 22. The noise suppression section 22 has low pass filters 32 and 33 that have different time constants and characteristics and a subtraction device 34 that obtains the difference between the outputs of the low pass filters 32 and 33. The signal supplied to the noise suppression section 22 is supplied to the low pass filters 32 and 33.

The low pass filter 32 is a filter that reduces dirk noise of microphones. In this example, recovery time constant $Tc_{RCV}$ of the low pass filter 32 is set for a larger value than attack time constant $Tc_{ATK}$. For example, attack time constant $Tc_{ATK}$ may have a time order for a sound that occurs with very short leading and trailing times (eg, a sound of hand clapping) and recovery time constant $Tc_{RCV}$ may have a time order for which a person responds to such a sound and it draws his or her attention. As a more specific example, attack time constant $Tc_{ATK}$ of the low pass filter 32 is set for several 10 milliseconds and recovery time constant $Tc_{RCV}$ is set in the range from 1 second to several seconds. For example, the filter coefficient is dynamically varied such that attack time constant $Tc_{ATK}$ and recovery time constant $Tc_{RCV}$ can be independently set.

With these characteristic settings of the low pass filter 32, direction control can be performed when a large sound occurs and the state can be maintained for a while after the sound becomes inaudible. In other words, dirk noise is a noise of a microphone. Even in an inaudible situation, the output signal of a microphone finely fluctuates. When attack time constant $Tc_{ATK}$ of the low pass filter 32 is set for a small value, dirk noise can be removed and direction control can be quickly performed corresponding to an effective sound. When recovery time constant $Tc_{RCV}$ of the low pass filter 32 is set for a large value, after direction control is performed corresponding to an effective sound, the control can be suppressed against another effective sound and the state corresponding to the first effective sound can be maintained.

The low pass filter 33 reduces so-called noise that arrives from a fixed direction. In other words, the low pass filter 33 aims to remove noise that occur at fixed locations (eg, an air conditioner and a fixed fan). Time constant Tc of the low pass filter 33 is set for a relatively large value, several seconds (eg, eight to nine seconds). With this setting of the low pass filter 33, direction control can be well performed depending on whether noise occurs at a fixed location or a noise source moves.

The subtraction device 34 subtracts the output of the low pass filter 33 from the output of the low pass filter 32. In other words, since the signal from which noise has been reduced by the low pass filter 33 is subtracted from the signal from which dirk noise has been reduced by the low pass filter 32, a noise component is removed from the signal supplied to the noise suppression section 22. The signal from which the noise component has been removed is output as an evaluation value in a corresponding direction from the signal process section 11.

Next, the process of the current direction emphasis section 12 that is a feature of an embodiment of the present invention will be described. As described above, evaluation values that are output from the signal process sections 11, 11, . . . and so forth evaluate the intensities of sounds corresponding to their directions. It is thought that the direction for which the evaluation value is the maximum is the direction that the video camera 1 is caused to face. If direction control for the camera platform 2, namely the video camera 1, is performed corresponding to the evaluation value, images that are shot may be frequently changed.

Assuming that two persons A and B who are apart through the video camera 1 are talking to each other, if the speakers are frequently changed between persons A and B, the evaluation values corresponding to the directions of persons A and B frequently change. As a result, direction control is performed to frequently reciprocate the video camera 1 between the direction of person A and the direction of person B. Images that were frequently changed between person A and person B cause the audience to feel uncomfortable.

As another example, if no sound arrives from any direction, evaluation values of all directions nearly become the same. In this situation, even if a direction corresponding to the maximum evaluation value is detected, it is worthless. In this case, small fluctuations of evaluation values may cause the directions of the video camera 1 to be frequently changed.

Thus, according to an embodiment of the present invention, an emphasis process is performed for evaluation values corresponding to a predetermined range of directions around the direction that the camera platform 2 (namely, video camera 1) faces (this direction is hereinafter referred to as the current direction). The emphasis process is performed by adding a predetermined value (>0) to relevant evaluation values. Instead, the emphasis process may be performed by multiplying relevant evaluation values by a predetermined coefficient (>1).

When the emphasis process is performed for relevant evaluation values, even if a sound having a predetermined intensity newly occurs in a direction not in the predetermined range around the current direction, it is not likely that the evaluation value corresponding to the direction of the new sound becomes larger than the emphasized evaluation value corresponding to the current direction. Thus, direction control for the direction of the sound that newly occurs is suppressed. As a result, the direction of the camera platform 2, namely the video camera 1, is maintained.

Figure 14:
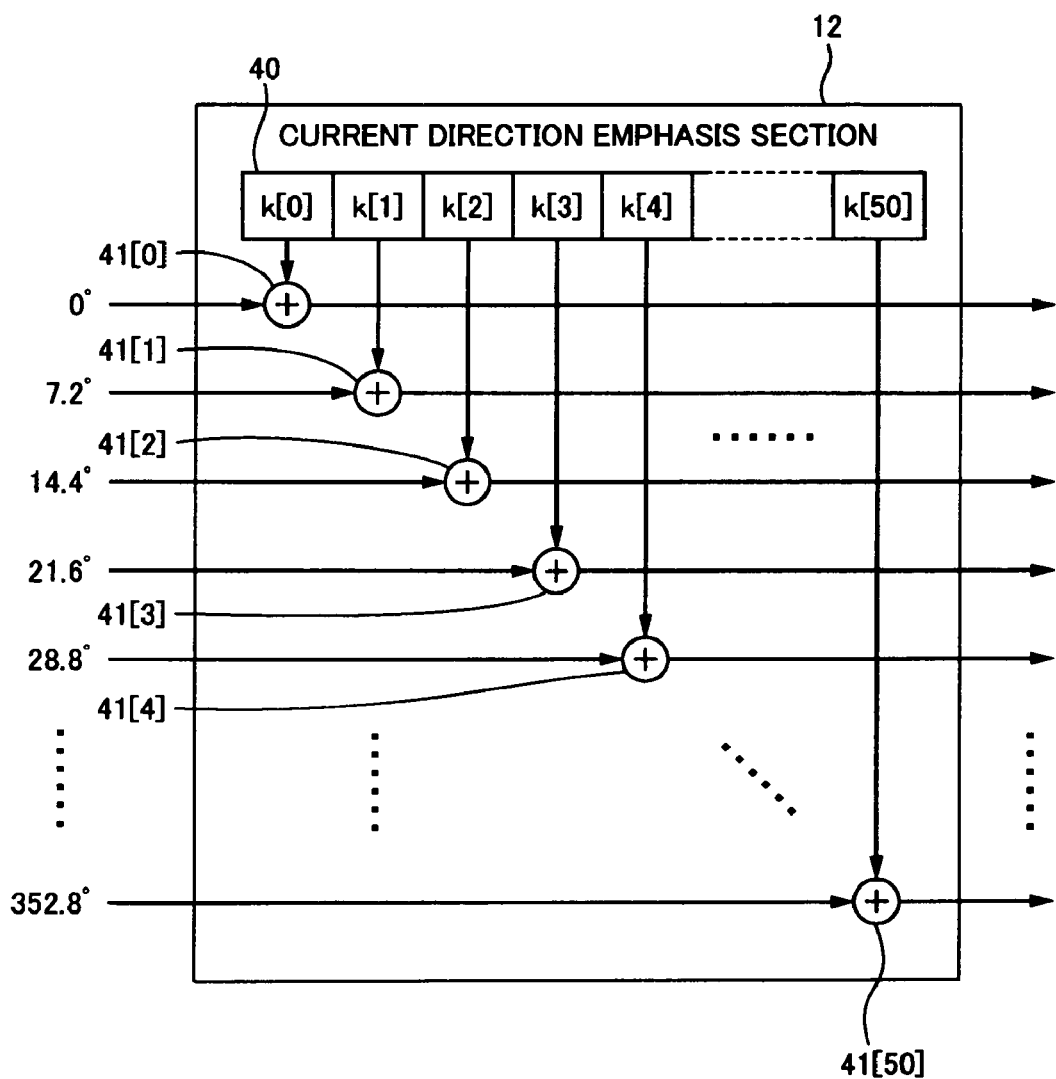
FIG. 14 is a block diagram showing an exemplary structure of a current direction emphasis section.

FIG. 14 shows an exemplary structure of the current direction emphasis section 12 that accomplishes the emphasis process for such evaluation values. The current direction emphasis section 12 adds predetermined values to evaluation values to perform the emphasis process for the evaluation values. Supplied to the current direction emphasis section 12 are evaluation values as outputs of audio signals of the signal process sections 11, 11, . . . and so forth of which the entire circumference 360° is divided into 50 channels at steps of 7.2° by the directivity synthesis section 10. The current direction emphasis section 12 has addition devices 41[0], 41[1], . . . , 41[n], . . . and 41[49] corresponding to the number of output channels of the directivity synthesis section 10 and an addition constant storage section 40 that supplies addition constants k[0] k[1], . . . , k[n], . . . , and k[49] corresponding to the addition devices 41[0], 41[1], . . . , 41[n], . . . and 41[49].

Addition constants k[0], k[1], . . . , k[n], . . . , and k[49] are supplied to first terminals of the addition devices 41[0], 41[1], . . . , 41[n], . . . and 41[49], respectively. Evaluation values that are output from the signal process sections 11, 11, . . . and so forth are supplied to second input terminals of the addition devices 41[0], 41[1], . . . , 41[n], . . . and 41[49], respectively. For example, evaluation values corresponding to audio signals having directivities of 0°, 7.2°, 14.4°, 21.6°, . . . , and 352.8° to the front are supplied to the addition devices 41[0], 41[1], . . . , 41[n], . . . and 41[49], respectively.

The addition devices 41[0], 41[1], . . . , 41[n], . . . and 41[49] add the addition constants that are supplied to the first input terminals to the evaluation values that are supplied to the second input terminals and output the results as new evaluation values.

Values of the addition constants k[0], k[1], . . . , k[n], . . . k[49] stored in the addition constant storage section 40 are set on the basis of information that represents the current direction. The current direction may be obtained from a rotation detection sensor disposed, for example, in the rotation drive section 15. Instead, the control signal generation section 14 may obtain the current direction on the basis of a drive control signal generated to drive the rotation drive section 15. The camera platform 2 and the rotation shaft 3 may have sensors thereon to detect the current direction. Instead, a microprocessor (not shown) that controls the direction control apparatus may store information that represents the direction for the direction control in a register or the like.

According to an embodiment of the present invention, addition constants k[n] are decided to more emphasize current direction Dr[n]. At this point, addition constant k[n] corresponding to current direction Dr[n] and addition constants k[n+1], k[n+2], . . . , k[n+a] corresponding to a plurality of directions Dr[n+1], Dr[n+2], . . . , Dr[n+a] adjacent to direction Dr[n], and addition constants k[n−1], k[n−2], . . . , k[n−a] corresponding to directions Dr[n−1], Dr[n−2], . . . , Dr[n−a] are set and the other addition constant k is 0.

FIG. 15 shows exemplary addition constants to be added to evaluation values. As the unit of addition constants, dB Sound Pressure Level (dBSPL) is used which corresponds to the intensity of a sound that a person can recognize. In the example shown in FIG. 15, a total of nine steps of four steps each on the left and right around the current direction, namely 64.8° where one step is 7.2° is a range in which evaluation values are emphasized. The angel of field of home-use video cameras is around 45° in non-zoom mode. Thus, the range in which evaluation values are emphasized may be set on the basis of the angle of field of the video camera.

In this example, the addition constant corresponding to the current direction is the maximum value. The values of addition constants decrease as the directions are more apart from the current direction. In the example shown in FIG. 15, the addition constant corresponding to the current direction is 38.4 dBSPL. The addition constant decreases by around 0.6 dBSPL as the direction is apart from the current direction by one step.

If n is 20, the values of addition constants k[n−4] to k[n+4] shown in FIG. 15 are input to the addition device 41[16] to addition device 41[24], respectively. Value 0 is input to the other addition devices, namely addition device 41[0] to addition device 41[15] and addition device 41[25] to addition device 41[49].

In the current direction emphasis section 12, the relationship between addition constants and addition devices to which they are supplied is controlled by a microprocessor (not shown) or the like on the basis of a predetermined program. The program may have been stored in a read-only memory (ROM) or the like connected to the microprocessor.

The addition constants stored, for example, in the addition constant storage section 40 may be rewritten corresponding to the current direction. Instead, addresses at which addition constants are stored in the addition constant storage section 40 may be converted corresponding to the current direction. Instead, the connections of the addition constant storage section 40 for the addition constants and the addition devices 41[0], 41[1], . . . , 41[n], . . . 41[49] may be changed corresponding to the current direction.

The evaluation values of individual directions emphasized corresponding to the current direction by the current direction emphasis section 12 are supplied to the maximum value detection section 13. The maximum value detection section 13 detects the maximum value from evaluation values supplied from the current direction emphasis section 12 and obtains the direction corresponding to the evaluation value detected as the maximum value. In other words, the direction corresponding to the evaluation value detected as the maximum value is the direction that the video camera 1 is caused to face.

Information that represents the direction corresponding to the maximum value of evaluation values, obtained by the maximum value detection section 13, is supplied to the control signal generation section 14. The control signal generation section 14 generates a control signal that controls the rotation drive section 15 to cause the camera platform 2 to face the direction represented by the direction information corresponding to the supplied direction information. The control signal may be a signal that designates the angle between the direction in which the rotation drive section 15 drives the camera platform 2 and the direction represented by the direction information. Instead, the control signal may be a signal that designates an absolute angle of the rotation drive section 15. If the rotation drive section 15 is driven at a step of a predetermined angle, the control signal may be a signal that designates the number of steps corresponding to the angle between the direction in which the rotation drive section 15 drives the camera platform 2 and the direction represented by the direction information. The rotation drive section 15 controls the motor corresponding to the control signal to rotate the rotation shaft 3 for a predetermined angle and cause the camera platform 2 to face the predetermined direction.

Figure 16A:
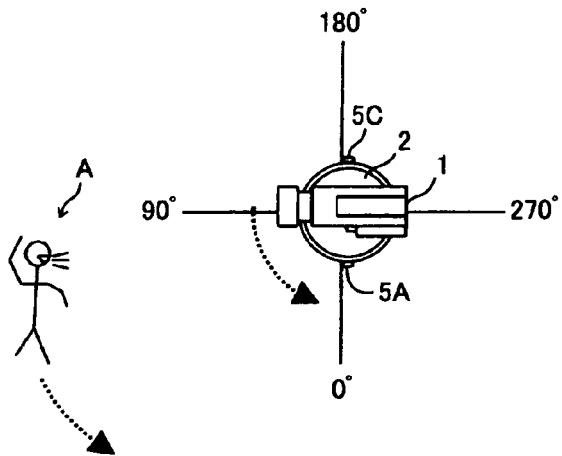
FIG. 16A and FIG. 16B are schematic diagrams describing a rotation drive control upon emphasis of an evaluation value in the current direction according to an embodiment of the present invention.
Figure 16B:
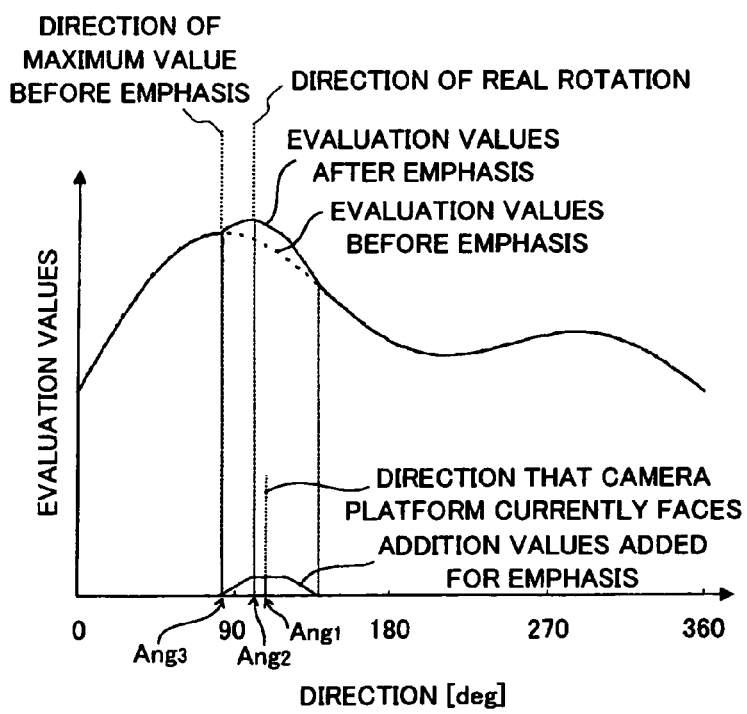

Next, with reference to FIG. 16A, FIG. 16B, FIG. 17A and FIG. 17B, a rotation drive control performed upon emphasis of the evaluation value in the current direction according to an embodiment of the present invention will be described. FIG. 16A and FIG. 16B show an example of which person A moves around the video camera 1 mounted on the camera platform 2 while he or she is speaking. As exemplified in FIG. 16A, it is assumed that the initial current direction of the camera platform 2 is around 90° to the front and person A is moving around the video camera 1, namely the camera platform 2 from direction 90° to direction 0°. In this case, it is expected that direction control is performed such that the video camera 1 follows the movement of person A.

FIG. 16B shows an exemplary distribution of evaluation values of the entire circumference 360° around the camera platform 2 (video camera 1) at a particular moment in the situation shown in FIG. 16A. The evaluation values are specifically discrete values at steps of which the entire circumference 360° is divided by a predetermined angle. In FIG. 16B and FIG. 17B, the evaluation values are represented by approximate curves.

In FIG. 16B, a dotted line represents evaluation values that have not been emphasized by the current direction emphasis section 12. In other words, the dotted line corresponds to evaluation values that are output from the signal process sections 11, 11, ..., and so forth corresponding to individual steps. It is assumed that the current direction of the camera platform 2 is angle $Ang_1$ slightly larger than 90°. In addition, it is assumed that person A is present at angle $Ang_3$ slightly smaller than 90° and is speaking. Thus, in the evaluation values that have not been emphasized, the evaluation value at angle $Ang_3$ is the maximum value. In addition, it is assumed that angle $Ang_3$ is outside the range in which addition constants are added. If evaluation values are not emphasized, the camera platform 2 is rotated from angle $Ang_1$ to angle $Ang_3$.

As described above, addition constants are added to evaluation values in the predetermined range around the current direction to emphasize the evaluation values. In FIG. 16B, evaluation values emphasized in the predetermined range around the current direction are represented by a solid line. Addition constants are added to evaluation values in a predetermined range around angle $Ang_1$ of the current direction. The maximum value of the evaluation values is angle $Ang_2$ in the predetermined range in which the addition constants are added to the evaluation values. Thus, the camera platform 2 is rotated from angle $Ang_1$ to angle $Ang_2$. In this case, since the direction of angle $Ang_2$ is inside the direction of angle $Ang_3$ corresponding to the position of person A, direction control is performed to track person A.

Figure 17A:
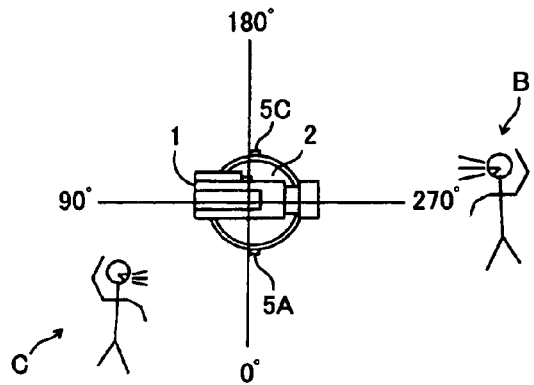
FIG. 17A and FIG. 17B are schematic diagrams describing a rotation drive control upon emphasis of an evaluation value in the current direction according to an embodiment of the present invention.
Figure 17B:
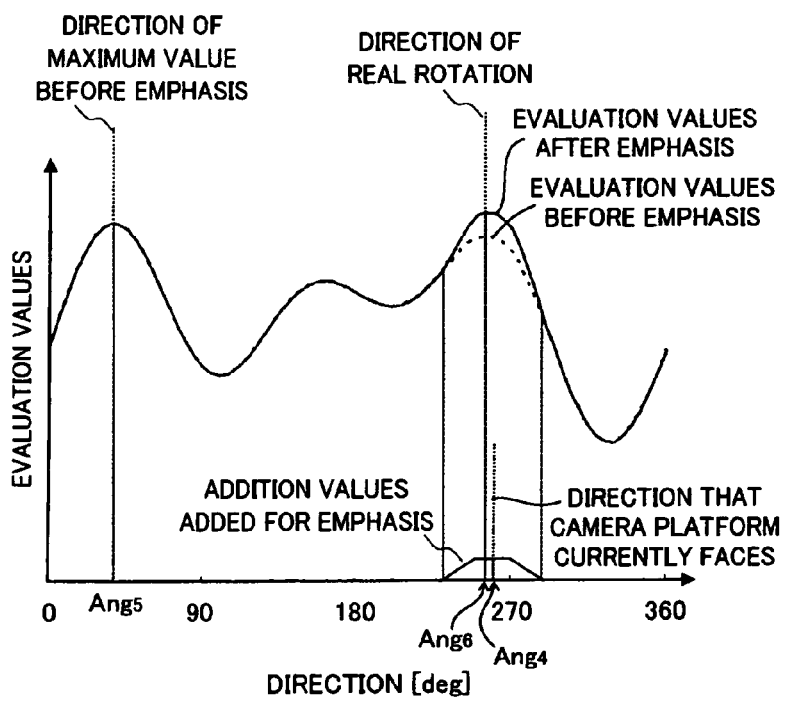

FIG. 17A and FIG. 17B show an example of which two persons B and C are talking through the video camera 1 (camera platform 2). As exemplified in FIG. 17A, the initial current direction of the camera platform 2 is angle $Ang_4$ that is slightly smaller than 270° to the front. Person B mainly talks in the current direction and person C sometimes talks in the direction of 45°. In this situation, person B may be a main speaker and person C may nod at him or her. In this case, it is thought that the video camera 1 necessitates mainly shooting person B and it does not necessitate facing person C.

FIG. 17B shows an exemplary distribution of evaluation values at a moment that person C nods at person B while he or she is speaking. In FIG. 17B, a dotted line represents evaluation values before emphasis by the current direction emphasis section 12. A first peak of evaluation values is present at angle $Ang_4$ corresponding to the voice of person B. In addition, a second peak of evaluation values is present at angle $Ang_5$ corresponding to the voice of person C. In the example shown in FIG. 17B, in the evaluation values before emphasis, the second peak is larger than the first peak. Thus, unless the evaluation values are emphasized, the camera platform 2 is rotated from angle $Ang_4$ to angle $Ang_5$.

In this case, since the rotation range of the camera platform 2 corresponding to the voice of person C is large, a field of vision of an image shot by the video camera 1 largely moves. If person B mainly speaks and person C nods at him or her, the video camera 1 that is shooting person B moves to the direction of person C whenever person C nods at him or her. Thus, images that are being shot frequently move, resulting in very uncomfortable images.

Evaluation values emphasized around the current direction as was described above are represented by a solid line in FIG. 17B. Addition constants are added to the evaluation values in a predetermined range around angle $Ang_4$ of the current direction. The maximum value of the evaluation values is angle $Ang_6$ in the predetermined range in which the addition constants are added to the evaluation values. Thus, the camera platform 2 is rotated from angle $Ang_4$ to angle $Ang_6$.

Angle $Ang_6$ is close to angle $Ang_4$ and the difference between angle $Ang_6$ and angle $Ang_4$ is much smaller than the difference between angle $Ang_6$ and angle $Ang_5$. Thus, the rotation range of the camera platform 2 is much smaller than that in the case that the evaluation values are not emphasized. As a result, whenever person C speaks, the camera platform 2 is not rotated toward him or her. Thus, the video camera 1 mounted on the camera platform 2 shoots person B while he or she is speaking. As a result, a desired image can be obtained.

Thus, according to this embodiment, direction control of both tracking the movement of a sound source and suppressing the reaction to a sound source in a direction largely different from the current direction can be performed. As a result, the direction control of the video camera 1 according to the method of this embodiment of the present invention allows for suppression of frequent changes of shooting directions, resulting in obtaining more natural images.

If the camera platform 2 is rotated immediately after its rotation was stopped, an image shot by the video camera 1 mounted on the camera platform 2 may become uncomfortable. Thus, the control signal generation section 14 performs stop control such that the camera platform 2 is not rotated for a predetermined time period after the rotation of the camera platform 2 was stopped. The stop control period may be fixed or variable. If the stop control period is variable, it may be set depending on the angle for which the camera platform 2 was rotated immediately before the stop control is performed. Instead, if the angle for which the camera platform 2 was rotated immediately before the stop control is performed is a predetermined value or less, the stop control may not be performed.

In the foregoing, the microphones 5A to 5D that collect sounds for evaluation values of individual directions are omnidirectional microphones. However, the present invention is not limited to such an embodiment. For example, unidirectional microphones may be disposed in individual directions and evaluation values of the individual directions may be obtained on the basis of sounds collected by the unidirectional microphones. If a plurality of unidirectional microphones are used, by obtaining the fixed location of a sound source that generates larger than a predetermined audio level based on sounds collected by, for example, adjacent two microphones, the direction thereof may be detected.

The foregoing embodiment describes that the direction of a sound on a horizontal plane is detected and only the left and right rotations (pan) are controlled. However, the present invention is not limited to such an embodiment. For example, the direction of a sound on a plane having a particular angle can be detected and direction control on the plane can be performed. For example, the direction of a sound on a vertical plane can be detected and the upper and lower directional rotations (tilt) can be controlled. In addition, sound detection and direction control are not limited to a two-dimensional plane. In other words, the direction of a sound may be detected on two perpendicular planes such as a horizontal plane and a vertical plane and direction control for the two planes may be performed, resulting in three-dimensional direction control. In this case, rotation drive apparatus may be disposed each on the two planes and they may be driven.

The foregoing embodiment describes that direction control is performed for the entire circumference 360°. However, the present invention is not limited to such an embodiment. In other words, the directional range for direction control may be, for example, 180° or 270°. The range in which the intensity of a sound is emphasized may be narrower than the directional range.

In the foregoing embodiment, the entire direction control apparatus is disposed on the camera platform 2 or a tripod, namely a device on which on the video camera 1 is mounted. However, the present invention is not limited to such an embodiment. Instead, the direction control apparatus may be disposed, for example, on the video camera 1.

The foregoing embodiment describes that the direction control apparatus exemplified in FIG. 2 is structured as hardware. However, the present invention is not limited to such an embodiment. In other words, the direction control apparatus exemplified in FIG. 2 may be structured as software. For example, in the structure shown in FIG. 2, the directivity synthesis section 10, the signal process sections 11, 11, ..., and so forth, the current direction emphasis section 12, and the maximum value detection section 13 may be structured as software. The software structure may include the control signal generation section 14. Outputs of the microphones 5A, 5B, 5C, and 5D are supplied as audio data through A/D conversion to the directivity synthesis section 10.

It should be understood by those skilled in the art that various modifications, combinations, sub-combinations and alternations may occur depending on design requirements and other factors insofar as they are within the scope of the appended claims or the equivalents thereof.

What is claimed is:

1. A direction detection method, comprising the steps of:
obtaining a distribution of intensities of sounds in a predetermined directional range;
emphasizing sounds in the distribution of the intensities of the sounds obtained at the distribution obtainment step, wherein at said emphasis step, the sounds in a second directional range which is a narrower directional range than the predetermined directional range are emphasized and a center of the second directional range corresponds to a direction represented by selection information; and
deciding a direction to be selected next based on the distribution of the intensities of the sounds which are output at the emphasis step and outputting the direction decided to be selected next as the selection information.

2. A program which causes a computer to execute a direction detection method, comprising the steps of:
obtaining a distribution of intensities of sounds in a predetermined directional range;
emphasizing sounds in the distribution of the intensities of the sounds obtained at the distribution obtainment step, wherein at said emphasis step, the sounds in a second directional range which is a narrower directional range than the predetermined directional range are emphasized and a center of the second directional range corresponds to a direction represented by selection information; and
deciding a direction to be selected next based on the distribution of the intensities of the sounds which are output at the emphasis step and outputting the direction decided to be selected next as the selection information.

3. A direction control method, comprising the steps of:
driving a drive section in a designated direction;
obtaining a distribution of intensities of sounds in a predetermined directional range;
emphasizing sounds in the distribution of the intensities of the sounds obtained at the distribution obtainment step, wherein at said emphasis step, the sounds in a second directional range which is a narrower directional range than the predetermined directional range are emphasized and a center of the second directional range corresponds to a direction in which the drive section is being currently driven at the drive control step; and
designating a direction in which the drive section is caused to drive based on the distribution of the intensities of the sounds which are output from the emphasis section at the drive control step.

4. A program which causes a computer to execute a direction control method, comprising the steps of:
driving a drive section in a designated direction;
obtaining a distribution of intensities of sounds in a predetermined directional range;
emphasizing sounds in the distribution of the intensities of the sounds obtained at the distribution obtainment step, wherein at said emphasis step, the sounds in a second directional range which is a narrower directional range than the predetermined directional range are emphasized and a center of the second directional range corresponds to a direction in which the drive section is being currently driven at the drive control step; and
designating a direction in which the drive section is caused to drive based on the distribution of the intensities of the sounds which are output from the emphasis section at the drive control step.

5. A direction detection apparatus, comprising:
a distribution obtainment section which obtains a distribution of intensities of sounds in a predetermined directional range;
an emphasis section which emphasizes sounds in the distribution of the intensities of the sounds obtained by the distribution obtainment section, wherein said emphasis section emphasizes the sounds in a second directional range which is a narrower directional range than the predetermined directional range and a center of the second directional range corresponds to a direction represented by selection information; and
a direction selection section which decides a direction to be selected next based on the distribution of the intensities of the sounds which are output from the emphasis section and outputs the direction decided to be selected next as the selection information.

6. The direction detection apparatus as set forth in claim 5, wherein the emphasis section emphasizes the sounds by adding constants larger than 0 to values which represent the intensities of the sounds in the second directional range.

7. The direction detection apparatus as set froth in claim 5, wherein the emphasis section emphasizes the sounds by multiplying values which represents the intensities of the sounds in the second directional range by coefficients larger than 1.

8. The direction detection apparatus as set froth in claim 5, wherein the distribution obtainment section obtains the intensities of the sounds based on signals of which audio signals collected by microphones have been processed by a low-pass filter, the low-pass filter setting a longer recovery time constant than an attack time constant.

9. The direction detection apparatus as set forth in claim 5, wherein the emphasis section changes emphasis levels for the direction represented by the selection information and both ends of the second directional range.

10. The direction detection apparatus as set forth in claim 9, wherein the emphasis section maximizes the emphasis level for the direction represented by the selection information and gradually decreases the emphasis level from the direction represented by the selection information to the both ends of the second direction range.

11. A direction control apparatus, comprising:
a drive control section which drives a drive section in a designated direction;
a distribution obtainment section which obtains a distribution of intensities of sounds in a predetermined directional range;
an emphasis section which emphasizes sounds in the distribution of the intensities of the sounds obtained by the distribution obtainment section, wherein said emphasis section emphasizes the sounds in a second directional range which is a narrower directional range than the predetermined directional range and a center of the second directional range corresponds to a direction in which the drive control section is currently driving the drive section; and
a direction designation section which designates a direction in which the drive control section causes the drive section to drive based on the distribution of the intensities of the sounds which are output from the emphasis section.

12. The direction control apparatus as set forth in claim 11, wherein the emphasis section emphasizes the sounds by adding constants larger than 0 to values which represent the intensities of the sounds in the second directional range.

13. The direction control apparatus as set froth in claim 11, wherein the emphasis section emphasizes the sounds by multiplying values which represents the intensities of the sounds in the second directional range by coefficients larger than 1.

14. The direction control apparatus as set froth in claim 11, wherein the distribution obtainment section obtains the intensities of the sounds based on signals of which audio signals collected by microphones have been processed by a low-pass filter, the low-pass filter setting a longer recovery time constant than an attack time constant.

15. The direction control apparatus as set forth in claim 11, wherein the drive control section does not drive the drive section after having driven the drive section.

16. The direction control apparatus as set forth in claim 11, wherein the emphasis section changes emphasis levels for the direction in which the drive control section is currently driving the drive section and both ends of the second directional range.

17. The direction control apparatus as set forth in claim 16, wherein the emphasis section maximizes the emphasis level for the direction in which the drive control section is currently driving the drive section and gradually decreases the emphasis level from the direction in which the drive control section is currently driving the drive section to the both ends of the second directional range.

18. The direction control apparatus as set forth in claim 11, wherein the drive section drives a camera platform.

19. The direction control apparatus as set forth in claim 18, wherein the second directional range is set based on an angle of field of a video camera mounted on the camera platform.

* * * * *